Nov. 4, 1930.  W. UEBELHOER  1,780,888
WHEEL PULLER
Filed Feb. 23, 1929
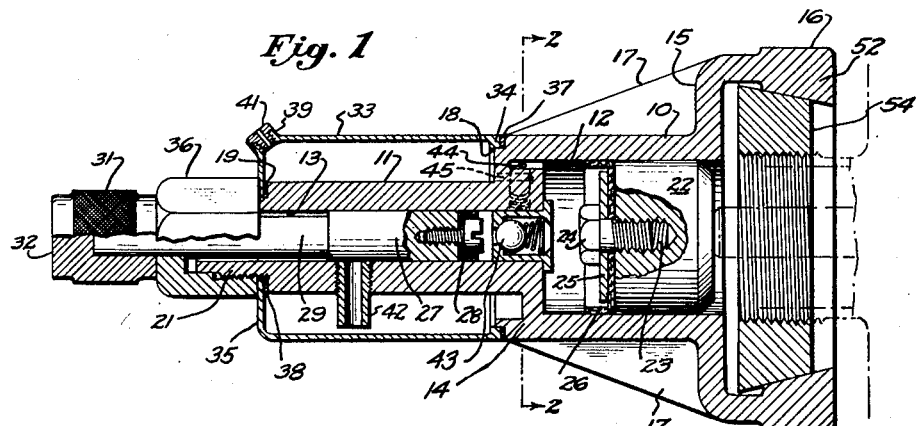
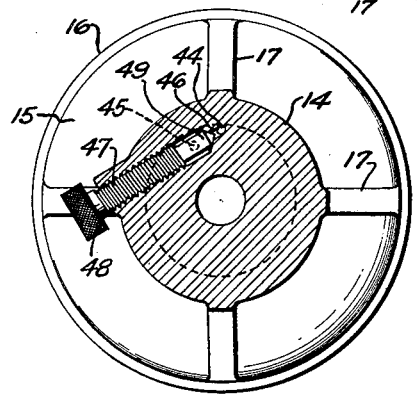
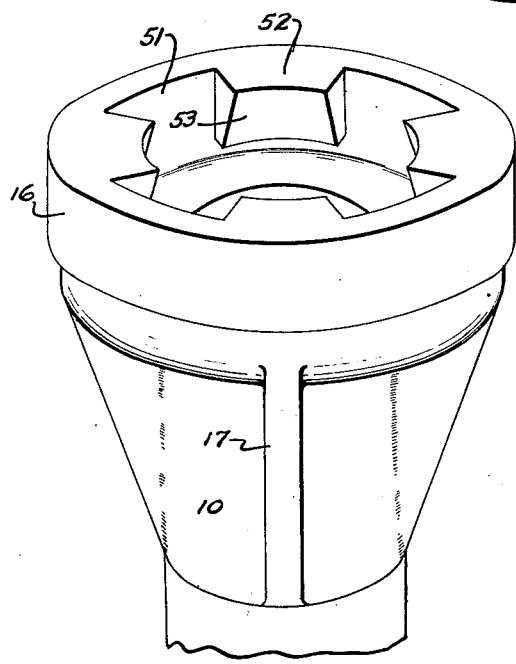
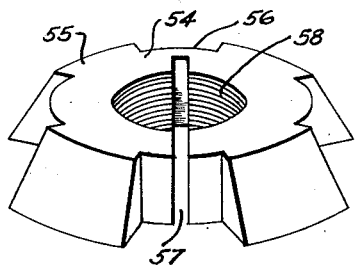
Inventor
Walter Uebelhoer
by Barton A. Bean Jr.
Attorney Patented Nov. 4, 1930

1,780,888

UNITED STATES PATENT OFFICE

WALTER UEBELHOER, OF BUFFALO, NEW YORK, ASSIGNOR OF ONE-HALF TO MARVIN UEBELHOER, OF BUFFALO, NEW YORK

WHEEL PULLER

Application filed February 23, 1929. Serial No. 341,989.

This invention relates to wheel pullers, and it has particular reference to a hydraulic device by means of which wheels, gears, or like parts may be readily removed from axles or shafts upon which they are mounted.

In describing the principles of the invention, I shall refer specifically to a device intended primarily for use by an automobile mechanic or other artisan as a shop tool for removing automobile wheels from axles, but it is to be understood that this reference is made for the purposes of illustration, and not as an explicit limitation. Heretofore, it has been customary to remove automobile wheels from tapered axles by means of tools, those in general use comprising a threaded nut which is screwed onto the wheel hub and a screw operated device for pressing against the end of the axle as additional force is applied. The desirability of such tools is well understood by those skilled in the art, as it is common experience that wheels "freeze" to the axles;—that is, the wheel and axles become so tightly interengaged by rusting, distortion, or the like, that ordinary manual means do not suffice in effecting a quick removal of the wheel.

Theoretically, there should be no particular difficulty in removing a wheel, formed with an internally tapered bore, from a correspondingly tapered axle. The wheel should slide along the tapered surface of the axle quite freely. As stated, however, freezing is often encountered, and there are numerous cases arising in every shop where the wheel can not be removed even by the screw operated types of wheel pullers now known. In such cases, heavy blows with sledges are usually directed against the wheel or axle, and, while the two elements are usually eventually separated, it is at the expense of practical destruction of either or both of the parts. As will be readily appreciated by those skilled in the art, what often appears to be the most innocent of blows on a wheel or axle results in bending or misalignment, for which the best practical cure is the replacement of the distorted part with a new part.

Hereinafter, I shall specifically describe a wheel puller which I have invented after experience with frozen wheels, and which has been found in practice to operate efficiently upon the most stubborn assemblies that have been encountered. This puller is of the hydraulic type, by means of which the applied force is greatly magnified, (or, contra-wise, a minimum of effort is required in effecting removal), and further, in distinction to heretofore proposed types of hydraulic pullers, is operated on an impact principle, rather than on the principle of a screw action. I desire to point out that I not only advantageously employ a body of liquid to magnify the applied force, but employ it in such a manner as to prevent the application of destructive forces or blows to the wheel and axle, or shearing stresses which would tend to damage the threaded portion of the wheel hub. The desired effects are obtained by providing a body into which are fitted a large piston for contacting with the work, and a small slidably movable piston or plunger which has an exposed end that may be struck with a hammer, thereby creating a sudden shock or impact that drives the plunger against a body of liquid interposed between the plunger and the work engaging piston. The initial force, applied to the plunger, being an impact instead of a gradually applied force, is much more effective and this effect is magnified, in accordance with well known principles of mechanics, by the large piston. The shock, or vibration, however, is not transmitted to the work, but is absorbed by the liquid body.

From another aspect, the invention further provides an improved type of adapter, or assemblage of parts by means of which one tool may be applied to wheels of various sizes. I have provided a tool having an enlarged head adapted to receive any one of a number of unitary conical rings which are internally dimensioned to fit wheels of various sizes, and all of which are externally dimensioned to fit within the head with a locking engagement obtained from cooperating parts analogous to breech lock or bayonet slot mechanisms. The advantages of this construction, obviously, reside in a great facility of assemblage and speed of operation, and also a high strength of parts without difficulties in the process of their manufacture.

Further objects and advantages in the more specific structure hereinafter described will be apparent from a consideration of the following detailed description of one embodiment of the principles of the invention, illustrated in the accompanying drawing, wherein:

Fig. 1 is a longitudinal cross-sectional view of the wheel puller;

Fig. 2 is a transverse cross-sectional view taken on the line 2—2 of Fig. 1;

Fig. 3 is a perspective view of the enlarged head of the tool; and

Fig. 4 is a perspective view of an adapter ring.

The wheel puller comprises a body portion which may be cast from metal including a cylindrical portion 10 of relatively large diameter and a second cylindrical portion 11 of relatively small diameter. The portion 10 is provided with a large internal cylindrical bore 12 forming a working chamber, while the portion 11 is formed with an aligned reduced bore 13 forming a compression or force chamber. A wall 14 is interposed between the chambers 12 and 13. The outer end of the body portion 10 is formed with a radial flange 15 that merges into a cylindrical flange 16 forming the adapter head, and which is strengthened and further secured to the body by means of spaced flanges or ribs 17 cast integral with the body 10. Adjacent the wall 14 the body 10 is machined to form a circumferential shoulder 18. The outer end of the body portion 11 is also formed with a shoulder 19, and with a reduced screw threaded section 21.

Within the working chamber 12 is positioned a work engaging piston 22 that is free to slide in and out of the chamber with a snug fit. The inner end of the piston 22 is formed with a screw threaded aperture 23 for the reception of a screw 24 that secures a holding plate 25 and a washer 26 to prevent leakage. A similarly slidably movable piston or plunger 27, provided on its inner end with a similarly secured washer 28 to prevent leakage, is positioned in the bore 13. The plunger 27 is provided with a reduced portion 29 adjacent its outer end, which projects beyond the body portion 11. To the extremity of the plunger is secured a knurled head 31 having a flat end 32 that advantageously may be case hardened or otherwise made resistant to blows. It will be noted that the plunger 27 is not screw threaded, or rigidly connected by mechanical linkage, or otherwise made in such manner that it can not be moved by a force directly applied to the end of the head 31. On the contrary, the plunger is freely slidable without rotary movement in and out of the bore 13.

Surrounding the body portion 11 is a cylindrical shell 33 having a flanged open end 34 for engagement with the shoulder 18 on the body portion 10 and a centrally apertured end wall 35 adapted to abut the shoulder 19 on the body portion 11. The shell 33, which forms a fluid reservoir, is secured in position by means of a cap screw 36 engaging the screw threaded portion 21 of the body 11. Leakage is prevented by interposing washers 37 and 38 at the joints. A threaded boss 39, adapted to receive an apertured plug 41, is provided on the shell 33 to permit of the filling of the reservoir with suitable fluid, the small aperture serving as an air vent.

The body portion 11 is transversely tapped through to the bore 13 to receive a tube 42 which is positioned within the limits of displacement of the plunger 27, and through which fluid may flow from the reservoir to the compression chamber. When the plunger 27 is pulled out, the chamber 13 is flooded, and when the plunger is pushed in, the opening in the tube 42 is closed, and the fluid in the chamber 13 is forced, by the continued inward movement of the plunger 27, into the working chamber 12. The duct or passage between the chambers 13 and 12 is provided with a by pass or ball valve 43 which opens to permit the fluid to flow into the chamber 12, but which is closed by pressure exerted in a reverse direction.

A closable by-pass is formed in the end wall 14 to permit of the return of fluid from the working chamber 12 to the fluid reservoir within the shell 33. This arrangement comprises a pair of radially spaced horizontally disposed tubes, one of which, 44, extends from the chamber 12 toward the reservoir, and the other of which, 45, extends from the outer surface of the end wall 14 toward the chamber 12. The tubes 44 and 45 overlap and are connected by means of a laterally extending duct 46 which merges into a screw threaded aperture 47 extending through the side wall of the body portion 10, as best shown in Fig. 2. The aperture 47 receives a headed screw 48 provided with a reduced and pointed end 49 extending into the duct 46. When the screw 48 is withdrawn, fluid may flow from the working chamber 12 into the reservoir through the tube 44, duct 46, and tube 45, but when the screw is tightened, this passage is closed.

I shall now describe the construction of the adapter head contained in the circumferential flange 16, and best illustrated in Figs. 3 and 4. The head is formed internally with a cylindrical wall 51 which is interrupted by spaced inwardly projecting lugs 52. The lugs 52 are tapered with outwardly converging conical surfaces 53, and they collectively sweep out an arc of about 180°, or, in other words, occupy about half the internal wall surface. These lugs are intended to interlock with an adapter ring, which consists of a conical ring 54 having outwardly projecting conical surfaced lugs 55 disposed in alternate relation with cylindrical surfaces 56. The lugs and recesses on the parts 16 and 54 are made complementary, so that the lugs 55 may slide freely through the spaces between the lugs 53. The maximum diameter of the ring 54, between opposed lug portions 55, is greater, however, than the minimum diameter between opposed lugs 53, so that, when the ring 54 is inserted in the head 16 and then turned, the surfaces 53 and 55 mutually engage with a wedging action, and so lock the ring 54 firmly to the remaining parts of the tool. The ring 54 is advantageously split, as indicated by the numeral 57, but is made in one piece. A screw threaded bore 58 is also formed in the ring 54, and is so dimensioned as to fit the threads of a given size wheel hub. As many rings as may be required, each having a different internal thread 58, may be provided, but their outer dimensions are all such as to permit of their assembly with one wheel puller.

In the operation of the device, to remove an automobile wheel, the procedure consists in jacking up the car, removing the hub cap and shaft nut, and fitting the proper size adapter ring on the wheel hub. The wheel puller is then brought up to the work, with the piston 22 pushed into a suitable position. If there is too much fluid in the working chamber 12, the excess may be removed by opening the duct 46 by manipulation of the screw 48. If there is not enough fluid to fill the chamber 12 completely, the valve 48 is closed, and the plunger 27 is pushed back and forth by hand to flood the chamber, fluid being pumped from the reservoir through the tube 42 and valve 43. Any entrapped air is eliminated by this operation, and also all loose play is taken up and the puller, with its adapter ring, is firmly seated on the work. Ordinary lubricating oil is a satisfactory fluid for shop use, although water, glycerine, or other substantially incompressible fluids may be employed.

The wheel puller and adapter ring are then interlocked by aligning the lugs 55 and the cylindrical portions 51. pushing the puller on the adapter ring as far as it will go, and then turning the puller through a small angle to effect the interlocking of the conical faces. Then the plunger 27 is operated by hand to force the piston 22 outwardly to engage the end of the axle, as indicated by the dotted lines in Fig. 1. Upon effecting such engagement, further inward motion of the plunger 27 is resisted by the adherence of the wheel to the axle. A blow or impact is then delivered on the striking face 32, and the force of this blow is delivered, through the incompressible liquid, to the piston 22, being magnified in proportion to the piston area ratios. It will be noted, that while a very great impact force is thus delivered on the end of the axle, and so causes the wheel to slip off, the destructive shock of an ordinary blow struck with metal on metal is not transmitted to the axle. The shock or vibration is absorbed by the body of liquid, and hence destructive forces are avoided. It will further be noted that the entire force is applied through the body of liquid, and that no shocks are transmitted through contact of metallic parts with other metallic parts. As is apparent from the drawing, the plunger 27 and piston 22 are always spaced.

From the foregoing description, it will be apparent that I have provided an efficient wheel puller which is simple in construction and application, and which may be employed to remove badly frozen wheels from axles or shafts. It will, of course, be understood that the invention is susceptible of numerous modifications and uses, and hence I desire the scope of the invention to be determined from the following claims.

What I claim is:—

1. A wheel puller comprising a body portion having a cylindrical bore extending therethrough, said bore being enlarged adjacent one end of the body portion, a work engaging piston slidably mounted in the enlarged bore portion of the body, an impact piston slidably mounted in the bore in the opposite end of the body, said impact piston projecting beyond the body and having a striking surface on the end thereof, said pistons being spaced, and a body of incompressible fluid between the pistons. said impact piston being free to move longitudinally in one direction only under the influence of an impact force applied normally to said striking surface.

2. A hydraulic wheel puller comprising a body portion formed with a cylindrical bore of relatively large diameter providing a working chamber, a work engaging piston slidably mounted in one end of the chamber, a bore of relatively small diameter formed in the body portion and communicating with the working chamber, an impact piston slidably movable in one direction only in the bore by means of a force directed entirely along the axis of the impact piston, said impact piston being spaced from said work engaging piston, said impact piston projecting exteriorly of said body portion and having a striking end, and incompressible fluid in the space between the impact piston and the work engaging piston, and means for supplying fluid to said impact piston bore when said piston is in an inoperative position, said means being closed when said impact piston is in an operative position.

3. A wheel puller comprising a body portion formed with an internal bore of relatively large diameter providing a working chamber, a work engaging piston slidably mounted in said chamber, a bore of relatively small diameter formed in the opposite end of the body portion and communicating with said working chamber, a plunger longitudinally movable in said bore of smaller diameter and projecting beyond the body portion, said plunger being movable in operation only in one direction, a normally closed fluid reservoir communicating with the bore of smaller diameter when said plunger is in an inoperative position, a valve positioned between the bore of smaller diameter and the working chamber to prevent the flow of liquid from the working chamber, and a closable by-pass between the working chamber and the reservoir.

4. A wheel puller comprising a body portion formed adjacent one end with an enlarged cylindrical bore providing a working chamber, a work engaging piston slidably mounted in said chamber, a bore of reduced diameter formed adjacent the opposite end of the body portion and communicating with the working chamber, a plunger slidably mounted in the reduced bore and projecting beyond the body portion, said plunger being movable in operation in only one direction, a fluid reservoir, there being a passage from said fluid reservoir into said reduced bore, said passage being opened when the plunger is in its extreme inoperative outer position and closed by said plunger when the plunger is in its operative inner position.

5. A wheel puller comprising a body portion formed adjacent one end with a large bore providing a working chamber, a work engaging piston slidably mounted in the chamber, a reduced bore aligned and communicating with the working chamber and extending to the opposite end of the body portion, a plunger slidably mounted in the reduced bore and projecting beyond the body portion, said plunger being movable in one direction only, the exposed end of the plunger being formed with a striking surface, a fluid reservoir, there being a passage from the fluid reservoir to the reduced bore closable when said plunger is in an inoperative position, a valve between the reduced bore and the working chamber, a by-pass between the working chamber and fluid reservoir, and means to close the by-pass.

6. A hydraulic wheel puller comprising a body portion formed with an enlarged bore at one end providing a working chamber, a work engaging piston slidably movable in the chamber, a reduced body portion connected to the first named body portion and formed with a bore, a longitudinally movable plunger in the bore, a fluid reservoir comprising a cylindrical shell surrounding the reduced body portion and abutting the first-named body portion, and a cap screw engaging the end of the reduced body portion and securing the shell to the body portion.

7. A hydraulic wheel puller comprising a body portion formed with an internal bore providing a working chamber, one end of the chamber being open, a work engaging piston mounted in the chamber for movement through said open end, the opposite end of the chamber being closed by a wall, a duct extending through the wall into a bore of reduced diameter, a plunger longitudinally movable only toward the work engaging piston in the reduced bore, a valve in the duct, a fluid reservoir surrounding said reduced bore, there being a passage formed in the wall between the reservoir and the working chamber, and a valve projecting from the side of the body portion for closing said passage.

8. In a wheel puller, a body portion formed with a working chamber at one end and a force chamber at the opposite end, a work engaging piston slidably mounted in said working chamber, an impact piston slidably mounted in said force chamber and projecting therethrough beyond said body portion, a duct connecting said chambers, and a by-pass valve in said duct openable only toward said working chamber, and a body of fluid between the pistons, said impact piston being adapted to receive blows on its projecting portion for imparting a movement to said impact piston, the liquid between the piston and said work engaging piston, said impact piston being only movable in one direction of operation.

9. In a wheel puller, a body portion having a central bore, a work engaging piston slidably mounted therein, an impact piston slidably mounted therein and projecting therethrough, a body of fluid between the pistons, said pistons and fluid being moved in a common direction in said bore by the reception of blows on the projecting portion of said impact piston, and means for maintaining said pistons against return to their original positions after each blow.

WALTER UEBELHOER.

CERTIFICATE OF CORRECTION.

Patent No. 1,780,888.  Granted November 4, 1930, to

WALTER UEBELHOER.

It is hereby certified that error appears in the printed specification of the above numbered patent requiring correction as follows: Page 4, line 48, claim 5, for the word "inoperative" read operative; and that the said Letters Patent should be read with this correction therein that the same may conform to the record of the case in the Patent Office.

Signed and sealed this 9th day of December, A. D. 1930.

M. J. Moore,
Acting Commissioner of Patents.